US 9,706,380 B1

United States Patent
Murchison

(10) Patent No.: US 9,706,380 B1
(45) Date of Patent: Jul. 11, 2017

(54) PROVIDING EMERGENCY NOTIFICATION AND TRACKING DATA FROM A MOBILE DEVICE

(71) Applicant: Blackpoint Holdings, LLC, Ellicott City, MD (US)

(72) Inventor: Jon Murchison, Ellicott City, MD (US)

(73) Assignee: Blackpoint Holdings, LLC, Ellicott City, MD (US)

( * ) Notice: Subject to any disclaimer, the term of this patent is extended or adjusted under 35 U.S.C. 154(b) by 0 days.

(21) Appl. No.: 15/066,709

(22) Filed: Mar. 10, 2016

(51) Int. Cl.
| | |
|---|---|
| H04M 11/04 | (2006.01) |
| H04W 4/22 | (2009.01) |
| H04W 4/02 | (2009.01) |
| H04W 4/00 | (2009.01) |
| H04W 4/06 | (2009.01) |

(52) U.S. Cl.
CPC ............ *H04W 4/22* (2013.01); *H04W 4/008* (2013.01); *H04W 4/021* (2013.01); *H04W 4/027* (2013.01); *H04W 4/06* (2013.01)

(58) Field of Classification Search
CPC ..... H04W 4/22; H04W 4/023; H04W 76/007; H04W 4/008; H04W 4/021; H04W 4/12; H04M 1/72538; H04M 2242/04; H04M 2250/12; H04M 11/04; H04M 1/7253; H04M 1/72552; H04M 2250/10; H04M 3/5116; H04M 2203/2094; H04M 3/42382; H04M 7/0033
USPC ............... 455/404.1, 404.2, 446, 456.1–457, 455/41.1–41.3
See application file for complete search history.

(56) References Cited

U.S. PATENT DOCUMENTS

| | | | |
|---|---|---|---|
| 8,472,915 B2 | 6/2013 | DiPerna et al. | |
| 8,538,374 B1* | 9/2013 | Haimo | G01S 19/17 |
| | | | 370/259 |
| 8,548,420 B2 | 10/2013 | Grunow et al. | |
| 8,588,733 B2 | 11/2013 | Ferguson et al. | |
| 9,183,731 B1* | 11/2015 | Bokhary | G08B 25/016 |
| 2005/0075116 A1* | 4/2005 | Laird | A61B 5/04 |
| | | | 455/456.3 |
| 2007/0182548 A1 | 8/2007 | Raad | |
| 2008/0081638 A1 | 4/2008 | Boland et al. | |
| 2013/0040600 A1* | 2/2013 | Reitnour | G01S 19/17 |
| | | | 455/404.2 |
| 2013/0122851 A1* | 5/2013 | Michaelis | H04W 76/007 |
| | | | 455/404.2 |

(Continued)

*Primary Examiner* — Allahyar Kasraian
(74) *Attorney, Agent, or Firm* — Sterne, Kessler, Goldstein & Fox P.L.L.C.

(57) ABSTRACT

Systems and methods are disclosed for providing emergency alert and tracking data from a mobile device. A panic mode may be activated on the mobile device. The panic mode may be activated via a button sequence on the mobile device, based on a geofence trigger, based on physical movement of or contact with the mobile device, or via a wearable device connected to the mobile device. Upon activation, other nearby devices may be detected. Each detected device may include at least one identifier. Situational data may also be periodically collected via one or more sensors of the mobile device, and the detected device identifiers and collected situational data may be transmitted to a tracking database. An alert may be sent to one or more parties in a panic group associated with the mobile device in response to activating the panic mode.

23 Claims, 8 Drawing Sheets

(56) References Cited

U.S. PATENT DOCUMENTS

2014/0031002 A1* 1/2014 Ranki .................. G01S 5/0027
455/404.2
2014/0051379 A1* 2/2014 Ganesh ............. H04M 1/72538
455/404.1

* cited by examiner

PROVIDING EMERGENCY NOTIFICATION AND TRACKING DATA FROM A MOBILE DEVICE

BACKGROUND

Field

Embodiments described herein are generally related to mobile monitoring and notification services.

Background

Connected mobile devices, such as cellular phones, smart watches, cameras, and fitness trackers, are increasingly ubiquitous. Most such devices are equipped with a variety of sensors, such as a camera, microphone, and accelerometer, and are capable of establishing a variety of connections, such as a cellular, Wi-Fi, Bluetooth, or GPS connection. In an emergency situation, mobile devices are commonly used to manually inform nearby law enforcement or track an individual through basic available location data, for example GPS data or cellular tower triangulation based on a cellular connection of the mobile device.

However, common methods of emergency notification and location tracking are insufficient to address and react to uncertain situations in which one or more connections of the mobile device are unavailable or the mobile device is not readily accessible. This may occur, for example, when an individual is in an isolated or obstructed location, or the mobile device has been removed from the individual's possession. Therefore, mobile devices and emergency applications must make use of all available resources during an emergency to address these less-than-optimal situations.

SUMMARY

Systems and methods are disclosed for providing emergency alert and tracking data from a mobile device. In an embodiment, a panic mode may be activated on the mobile device. In various embodiments, the panic mode may be activated, for example, via a button sequence on the mobile device, based on a geofence trigger, based on physical movement of or contact with the mobile device, or via a wearable device connected to the mobile device. When the panic mode is activated, other devices within the vicinity of the mobile device may be detected. Each detected device may include at least one identifier. Situational data may also be periodically collected via one or more sensors of the mobile device, and the detected device identifiers and collected situational data may be transmitted to a tracking database. An alert may be sent to one or more parties in a panic group associated with the mobile device in response to activating the panic mode.

In an embodiment, a panic assistance mode may be activated on partner devices within the vicinity of the mobile device. Situational data may be collected from the partner devices, and each partner device may continuously search for the mobile device and other devices detected by the mobile device while the panic assistance mode is active. An alert may be transmitted to the one or more parties in the panic group when the mobile device or one of the other devices detected by the mobile device is found.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art(s) to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Example System and Mobile Device

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to include such feature, structure, or characteristic in connection with other embodiments whether or not explicitly described.

Figure 1:
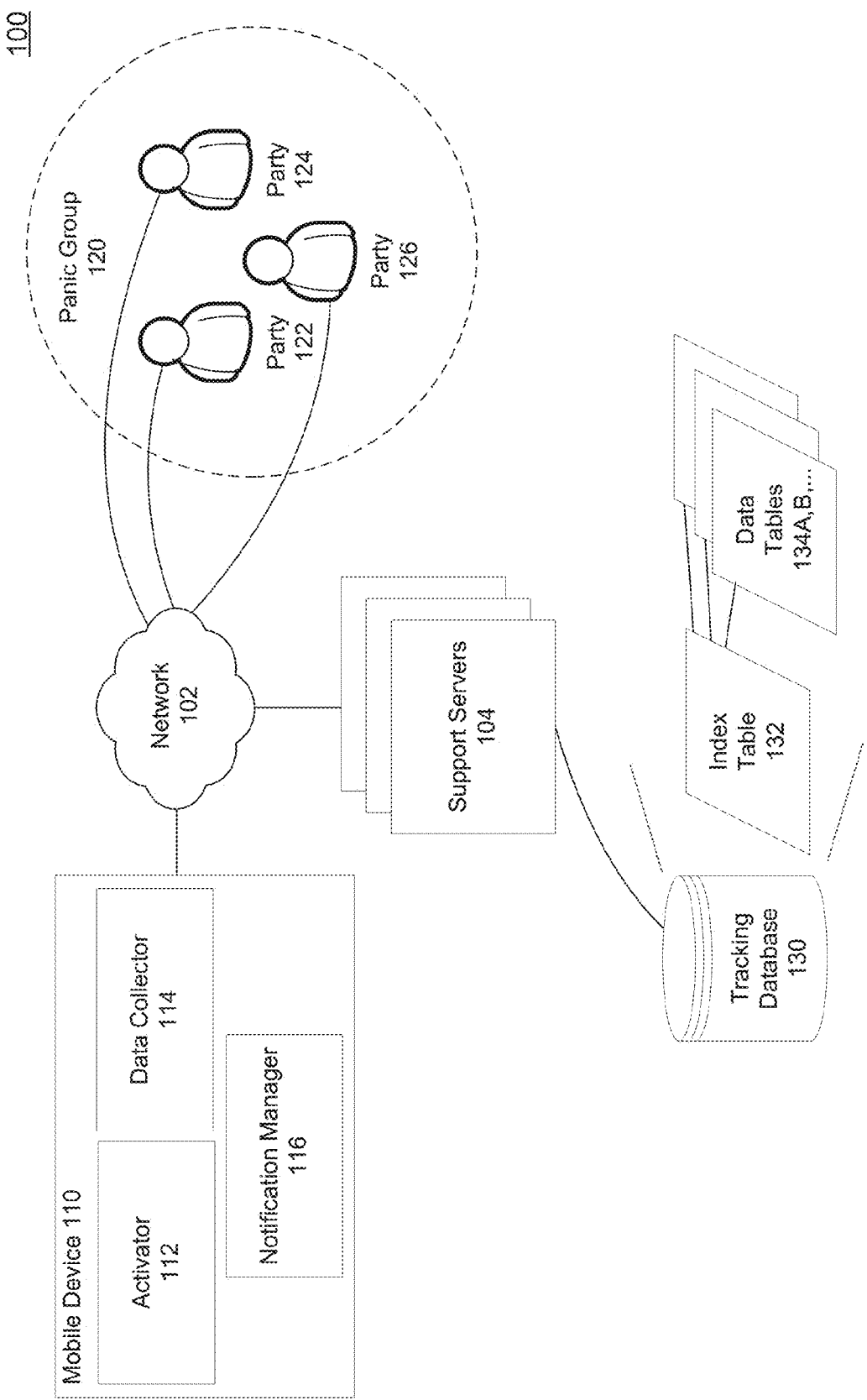
FIG. 1 is an example system for providing emergency notification and tracking data from a mobile device, according to an embodiment.

FIG. 1 is an example system 100 for providing emergency notification and tracking data from a mobile device, according to an embodiment. Mobile devices often include a variety of sensors and connection capabilities that may be used to gather and transmit various data. This data often includes photographs, audio recordings, and global positioning system (GPS) or other location data. This data and common connection capabilities may aid in tracking an individual and providing alerts in an emergency situation, but these data and capabilities on their own do not account for most contingencies, in particular when certain data or connections are unavailable, the mobile device is not readily accessible, or the mobile device has been disabled or lost. These situations are addressed by system 100 to ensure reliability in providing emergency alerts and tracking data to appropriate parties.

System 100 includes a mobile device 110 coupled to support servers 104 and panic group 120 via a network 102. Mobile device 110 may be any type of movable computing device, including, but not limited to, a mobile phone, personal digital assistant (PDA), wearable device (e.g., smart watch or fitness tracker), laptop, desktop, embedded device, etc. Network 102 may be any type of computer network capable of communicating data, for example, a local area network, a wide-area network (e.g., the Internet), or any combination thereof. Support servers 104 may each be any type of computing device, including, but not limited to, a desktop, server, mobile device, appliance, game console, television, set-top box, embedded device, etc. Support servers 104 may also be coupled to a tracking database 130.

In an embodiment, mobile device 110 may include an activator 112, a data collector 114, and/or a notification manager 116. In an emergency situation, activator 112 may be configured to activate a panic mode on mobile device 110. Activator 112 may initiate the panic mode in response to different triggers in various embodiments. For example, a user of mobile device 110 may explicitly instruct activator 112 to activate the panic mode through a particular button sequence, touch screen pattern, or voice command (e.g., holding a power button and volume button on mobile device 110 for five seconds, entering a predefined numeric code into a phone application of mobile device 110, or verbally speaking a predefined word or phrase).

The panic mode may also be activated based on entering or exiting a defined geofence, for example if mobile device 110 leaves an area in which the device was expected to remain or deviates from an expected route. In an embodiment, geofence boundaries for mobile device 110 may be determined automatically based on previous activity. For example, mobile device 110 may periodically collect and store location data, and activator 112 and/or support servers 104 may analyze location data while mobile device 110 is not in panic mode to determine common movement patterns. Geofence triggers may then be set based on expected patterns of mobile device 110.

In another example, the panic mode may be activated based on physical movement or contact with the device, for instance if the mobile device is thrown or experiences considerable physical impact. Movement or contact may be detected by one or more motion-detecting sensors of mobile device 110, including, but not limited to, an accelerometer, a gyroscope, a digital or analog compass, or a barometer. In yet another example, the panic mode may be activated via a wearable device, for instance via a smart watch or fitness tracker connected to mobile device 110. In example embodiments, the wearable device may be connected to mobile device 110 via a Bluetooth or shared Wi-Fi connection. In various embodiments, activator 112 may be configured to activate the panic mode in response to one or more of the previously described triggers, or any combination thereof.

Upon activating the panic mode on mobile device 110, notification manager 116 may send an alert to one or more parties 122-126 in panic group 120. Parties 122-126 may include, for example, law enforcement and other emergency personnel, family members, coworkers, or other parties designated to receive notification in case of emergency. In an embodiment, the alert may be sent via an existing cellular or Wi-Fi connection of mobile device 110, using for example an Internet Protocol (IP) connection. The alert may be sent directly from mobile device 110 to parties 122-126 via network 102, or the alert may be sent to support servers 104 via network 102, and then routed from support servers 104 to parties 122-126 to minimize transmission from mobile device 110. In an embodiment, a user of mobile device 110 may receive haptic feedback from the device when the alert is received by a party 122-126 of panic group 120 or at support servers 104. This provides an acknowledgement that the alert has been successfully transmitted.

In an embodiment, the alert may also be sent via an encrypted or unencrypted Short Message Service (SMS) text message, or similar messaging services. This type of transmission may increase reliability of emergency alerts in areas where cellular service or bandwidth is limited. Due to size limitations, an alert sent via an encrypted SMS message may be split into multiple SMS messages. In an embodiment, alerts may be sent periodically (e.g., every 30 seconds) for redundancy purposes until receiving confirmation that the alert has been received by parties in panic group 120 or at support servers 104.

According to an embodiment, when the panic mode on mobile device 110 is activated, data collector 114 may collect situational and location-based data in order to assist emergency response. In an embodiment, data collector 114 may record an audio segment via a microphone on mobile device 110 and capture one or more photographs (images) and/or video via the camera(s) on mobile device 110. Collection of audio, video, and photographs may occur immediately upon activation of the panic mode, and/or may be initiated based on particular triggers. For example, data collector 114 may be configured to record an audio clip (e.g., a 15-second audio segment) both immediately upon activation of the panic mode, and any time the surrounding decibel-level observed by mobile device 110 exceeds a predefined threshold. In this example, data collector 114 may primarily record audio when a person is speaking or other activity is occurring. Similarly, data collector 114 may be configured to capture a photograph or video both immediately upon activation of the panic mode, and in response to interaction with mobile device 110. For example, an image or video may be captured when the power button is depressed, an invalid password is entered, a biometric sensor is used, or any other interaction with mobile device 110 is detected. The collected images, video, and audio recordings may be used by emergency responders in locating mobile device 110 and developing a response strategy.

In an embodiment, data collector 114 may also periodically obtain and record location data derived from a GPS receiver of mobile device 110 when available. Collected GPS location data may provide an efficient way to locate mobile device 110, but this information may not always be available or accurate. As such, in an embodiment, data collector 114 may additionally record movement of mobile device 110 via one or more motion-detecting sensors of the mobile device including, but not limited to, an accelerometer, a gyroscope, a digital or analog compass, or a barometer. Movement collected by data collector 114 may supplement the collected GPS data in determining the location of mobile device 110 when the panic mode is activated. For example, an estimated location of mobile device 110 may be calculated based on recorded movement of the device since the last recorded GPS location.

Upon activation of the panic mode on mobile device 110, according to an embodiment, data collector 114 may further search for and detect other devices within the vicinity of mobile device 110. The term "vicinity" may be a set distance from the mobile device (e.g., 10 meters, 100 meters, or 1,000 meters) or mean within wireless communication range of the mobile device. In addition to a GPS receiver, mobile device 110 may be capable of establishing other data connections, such as Bluetooth, Wi-Fi, and cellular connections. When the panic mode is activated, data collector 114 may scan for devices that are visible via one or more of the available data connections of mobile device 110. For example, data collector 114 may detect a mobile phone, computer, or car visible via a Bluetooth connection, a nearby cellular tower or base station via a cellular connection, or a Wi-Fi access point visible via a Wi-Fi connection. For each detected device, one or more identifiers may be recorded, such as a Bluetooth address, Cell ID, service set identifier (SSID) (e.g., Wi-Fi network name), basic service set identifier (BSSID) (e.g., address of Wi-Fi access point), or media access control (MAC) address. In an embodiment, additional device information may also be recorded when available, such as device location information.

After an initial scan, data collector 114 may continuously or periodically scan for other devices in the vicinity of mobile device 110 while the panic mode is active. If mobile device 110 is moving, for example, this will ensure devices are detected as they become visible to mobile device 110.

Collected situational data and recorded device identifiers (and other recorded device information, if any) may periodically or continuously be transmitted to support servers 104 via network 102 for further analysis and storage. In an embodiment, support servers 104 may write the received situational data and device identifiers to tracking database 130. Data collector 114 may also bypass support servers 104 and transmit the collected situational data and detected device identifiers directly to tracking database 130 via network 102.

Tracking database 130 may store some or all of data collected and/or recorded by mobile device 110. In an embodiment, support servers 104 may include an updater and a query manager configured to interact with tracking database 130. Alternatively, the updater and query manager may reside within mobile device 110, or on both mobile device 110 and support servers 104. To improve performance of database queries and updates, database 130 may also include an index table 132. In an embodiment, the updater may query index table 132 to assist with data insertions and updates, and the query manager may query index table 132 to assist with data retrieval. In an embodiment, the index table may point to entries in data tables 134, which include data records. Or, in an embodiment where the database is de-normalized, the index table may itself include individual data records in part or in full. In this way, index table 132 may be used to improve performance of database queries and updates.

In an embodiment, mobile device 110 may obtain and record location data even when the panic mode has not been activated. This data may normally be analyzed, outside of an emergency context, to develop a pattern of life that can be used to identify locations of interest to a user (e.g., home and work) and predict future movements and user actions. The recorded location data may be transmitted to tracking database 130 on a periodic basis. Once the panic mode is activated on mobile device 110, the frequency of data collection and transmission of collected data may be increased. For example, mobile data collector 114 may normally only transmit recorded location data when a Wi-Fi connection is established, but may transmit recorded data every 60 seconds when the panic mode is active.

In certain instances, mobile device 110 may not be able to establish a data connection via a cellular network or known Wi-Fi network. This may occur, for example, when mobile device 110 is in an isolated or obstructed location. In order to transmit data in an emergency situation, data collector 114 may search for and connect to available public Wi-Fi networks. This may enable critical data and alerts to be transmitted to appropriate parties when expected data connections cannot be established.

Emergency responders may use support servers 104 to analyze data transmitted and written to tracking database 130. For example, photographs, video, and audio recordings captured by mobile device 110 may be used to identify persons of interest or locate mobile device 110 based on particular features present in the photographs, video, or audio recordings. In an embodiment, these features may be cross-referenced to one or more third-party databases to aid in identifying the persons of interest or potential locations. Recorded identifiers for detected devices may also be cross-referenced to one or more third-party databases to identify a location for the device. This information may be used to estimate and track the location of mobile device 110. In this manner, data collected and transmitted by mobile device 110 may be used to track and estimate a geolocation of the mobile device, even when reliable GPS data is unavailable.

Each of support servers 104 in FIG. 1 may be implemented on the same or different computing devices having server functionality, in hardware, software, or any combination thereof. Further, a computing device can include, but is not limited to, a device having a processor and memory, including a nontransitory memory, for executing and storing instructions. The memory may tangibly embody the data and program instructions. Software may include one or more applications and an operating system. Hardware may include, but is not limited to, a processor, memory, and graphical user interface display. The computing device may also have multiple processors and multiple shared or separate memory components. For example, the computing device may be a part of or the entirety of a clustered computing environment or server farm.

Various use cases may benefit from activation and operation of a panic mode as described above. One example may apply to child safety, where a child may carry mobile device 110. In the event that the child gets separated from her parent, lost, or abducted, the child may activate the panic mode on mobile device 110 via activator 112. In this case, mobile device 110 may collect situational data and detect other devices in the surrounding area. This data may in turn be used by the parent to track mobile device 110, and support servers 104 may alert the parent of potential locations of mobile device 110 based on analysis of the collected situational data and detected nearby devices. In an embodiment, once the child activates the panic mode on mobile device 110, the parent may be able to specifically request further collection of data from mobile device 110, in addition to data normally collected during the panic mode (e.g., ad hoc requests for audio recordings or photographs).

Another example may apply to abduction of an individual. In this case, activation of a panic mode on mobile device 110 may provide initial alert and critical data needed to locate the abductee and strategize a safe rescue operation. For example, abductors may power off, destroy, or otherwise disable mobile device 110 to prevent tracking by law enforcement or other emergency responders. Photographs, video, and audio may be taken of abductors based on particular triggers while mobile device 110 is in panic mode, such as an attempt to power off the mobile device, entry of an incorrect password, or sudden movements of the mobile device. Detection of devices within the vicinity of mobile device 110 may also benefit in tracking the location of the abductee. For example, an abductor may be driving in a car with a Bluetooth connection or using a Wi-Fi enabled camera. Once identifiers for these devices are recorded and transmitted, law enforcement and other emergency responders may use location information associated with the detected devices to estimate the location of mobile device 110. Responders may also continuously search for these device identifiers, which may provide an indication of proximity to the abductee, even in the case where mobile device 110 is disabled.

Figure 2:
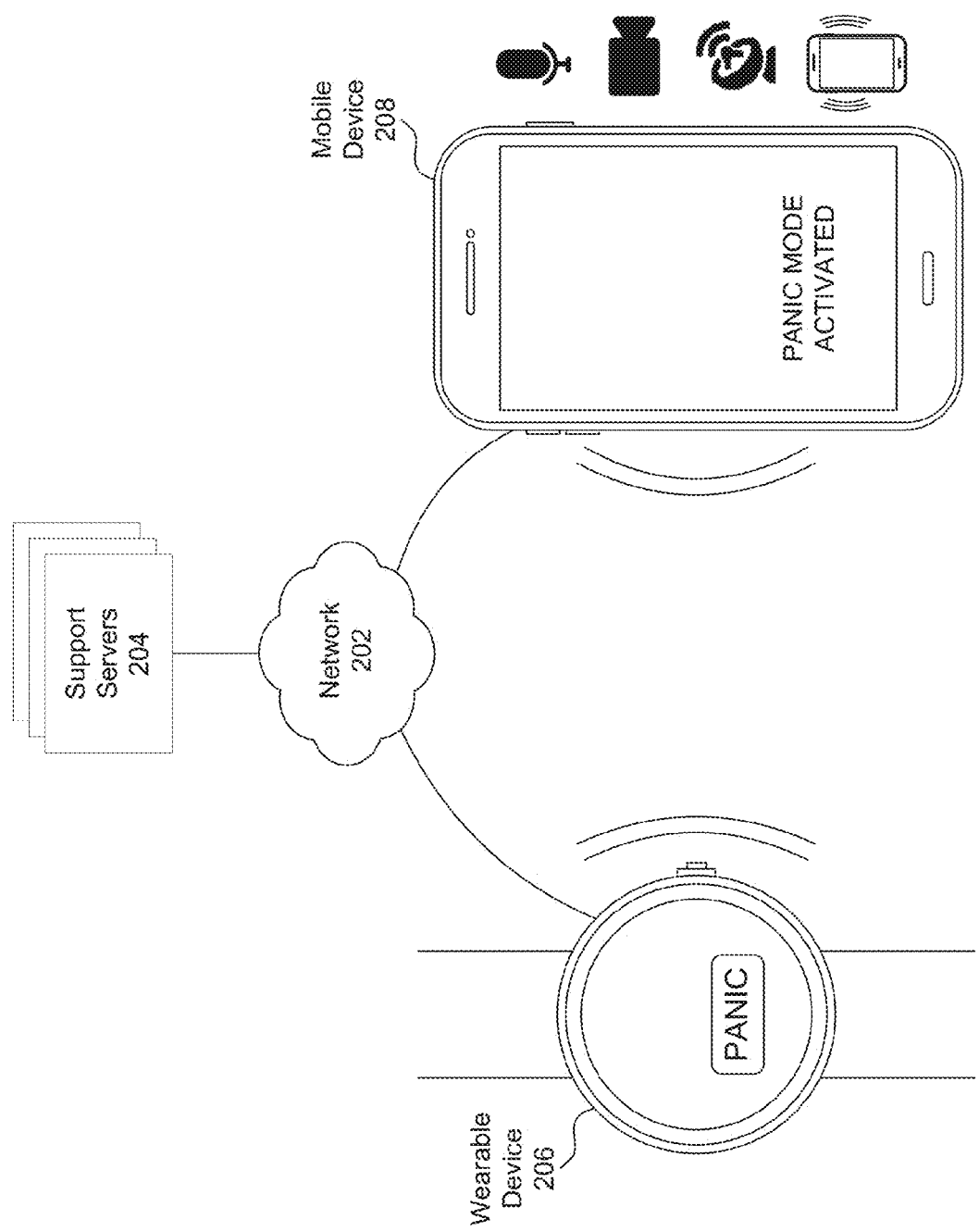
FIG. 2 is a diagram illustrating example activation of a panic mode from a wearable device, according to an embodiment.

FIG. 2 is a diagram 200 illustrating example activation of a panic mode from a wearable device, according to an embodiment. As illustrated in FIG. 2, wearable device 206 and mobile device 208 may be coupled to support servers 204 via network 202. Network 202, support servers 204, and mobile device 208 may be similar to network 102, support servers 104, and mobile device 110 of FIG. 1, respectively. Wearable device 206 may be any type of worn or carried device such as, but not limited to, a smart watch, a fitness tracker, or a connected sensor embedded within an article of clothing. Wearable device 206 may be connected to mobile device 208 via any type of available wired or wireless connection, such as a Bluetooth or shared Wi-Fi connection. In an embodiment, wearable device 206 may also be coupled to support servers 204 directly via Wi-Fi, cellular, or other wireless communication.

FIG. 2 illustrates an example in which a user is wearing wearable device 206 and carrying mobile device 208. In this example, the user may activate a panic mode on mobile device 208 via wearable device 206. The panic mode may be activated based on the one or more activation triggers discussed previously with respect to FIG. 1, for example a predefined button sequence or audio command, movement of wearable device 206, or entry into or exit from a defined geofence. Panic mode on mobile device 208 may also be activated upon disconnection from wearable device 206, for instance if wearable device 206 and mobile device 208 are separated by sufficient distance.

The ability to activate the panic mode from wearable device 206 may save time in an emergency situation and enable activation when mobile device 208 is not readily accessible. In an embodiment, a panic mode may also be activated on wearable device 206 itself, in addition to or as an alternative to activating a panic mode on mobile device 208. Wearable device 206 may perform some or all of the same functions as described with respect to mobile device 110 of FIG. 1, and may similarly include one or more sensors capable of collecting situational data, such as audio, photographs, video, movement, and location data, and one or more data receivers capable of establishing a data connection. This data may be transmitted to support servers 204 via network 202 for storage in a tracking database, such as tracking database 130 of FIG. 1.

Figure 3:
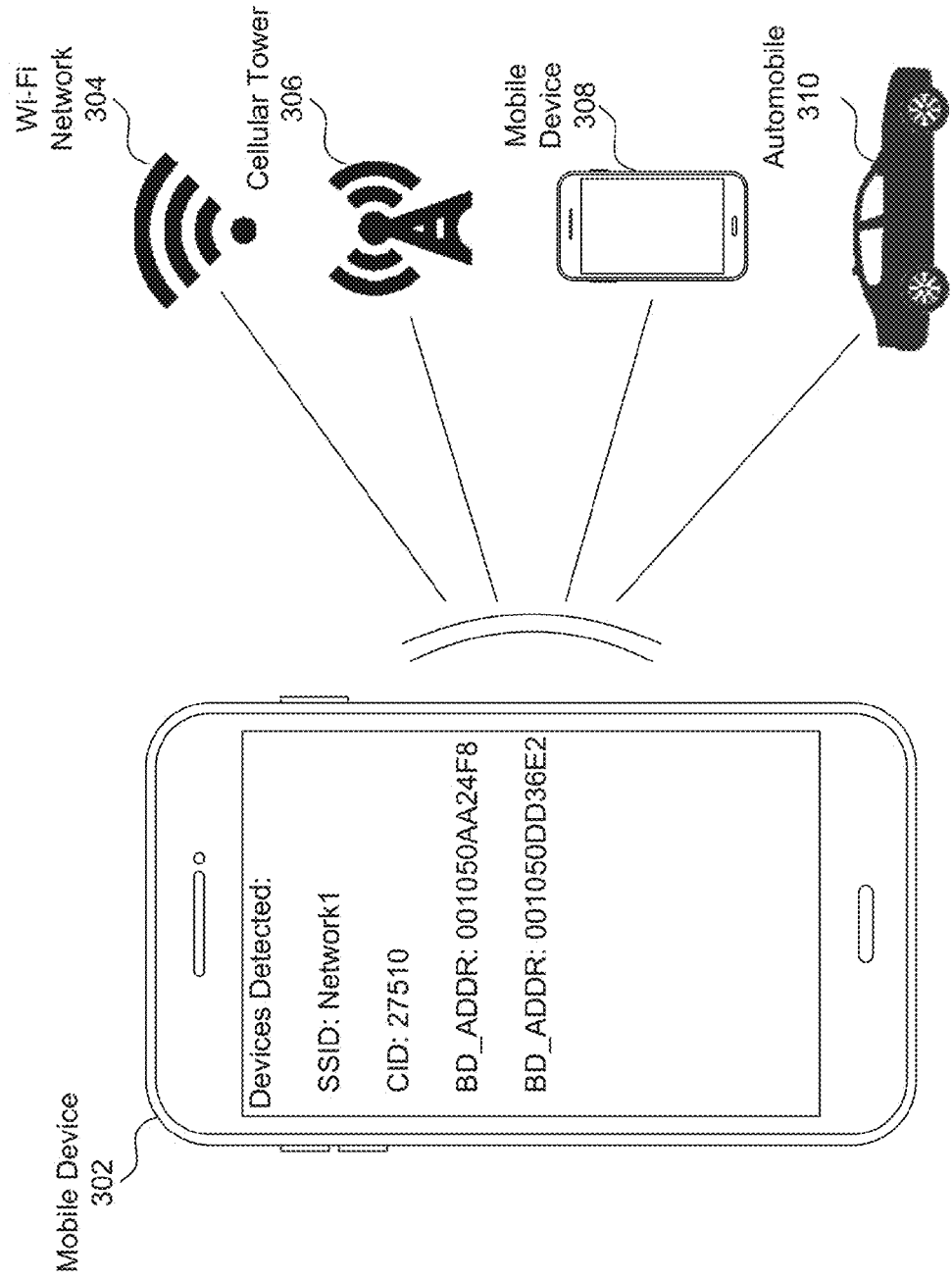
FIG. 3 is a diagram illustrating example detection of devices within the vicinity of a mobile device, according to an embodiment.

FIG. 3 is a diagram 300 illustrating example detection of devices within the vicinity of a mobile device, according to an embodiment. In an embodiment, mobile device 302 may be similar to mobile device 110 of FIG. 1.

When a panic mode is activated on mobile device 302, a data collector, such as data collector 114, may scan for devices that are visible via one or more of the available data connections of mobile device 302. For each detected device, one or more device identifiers may be obtained and recorded. For example, the data collector may detect Wi-Fi network 304 via an available Wi-Fi connection of mobile device 302, cellular tower 306 via an available cellular connection, and mobile device 308 and automobile 310 via an available Bluetooth connection.

As depicted in FIG. 3, example identifiers are provided for detected devices 304-310. For example, Wi-fi network 304 may be identified by the SSID "Network1," which may be recorded by mobile device 302 and transmitted to a tracking database, such as tracking database 130 of FIG. 1, for storage and further analysis. In this case, the SSID may be cross-referenced to one or more third-party databases to estimate a location where Wi-Fi network 304 is present. In an embodiment, a particular Wi-Fi access point within Wi-Fi network 304 may provide another identifier for the network in the form of a BSSID. The BSSID may refer to the MAC address of a device acting as the Wi-Fi access point.

In an embodiment, cellular tower 306 may be identified by a Cell ID (CID) and mobile device 308 and automobile 310 may be identified by Bluetooth addresses. These identifiers may similarly be cross-referenced to one or more third-party databases to estimate locations of the detected devices, or to determine the make, model, and year of an automobile 310. For example, Bluetooth addresses or Wi-Fi addresses/SSIDs may be correlated to certain makes, models, or years of automobiles. In an embodiment, the identifiers may further be used by emergency responders to detect when the corresponding device is nearby.

Figure 4:
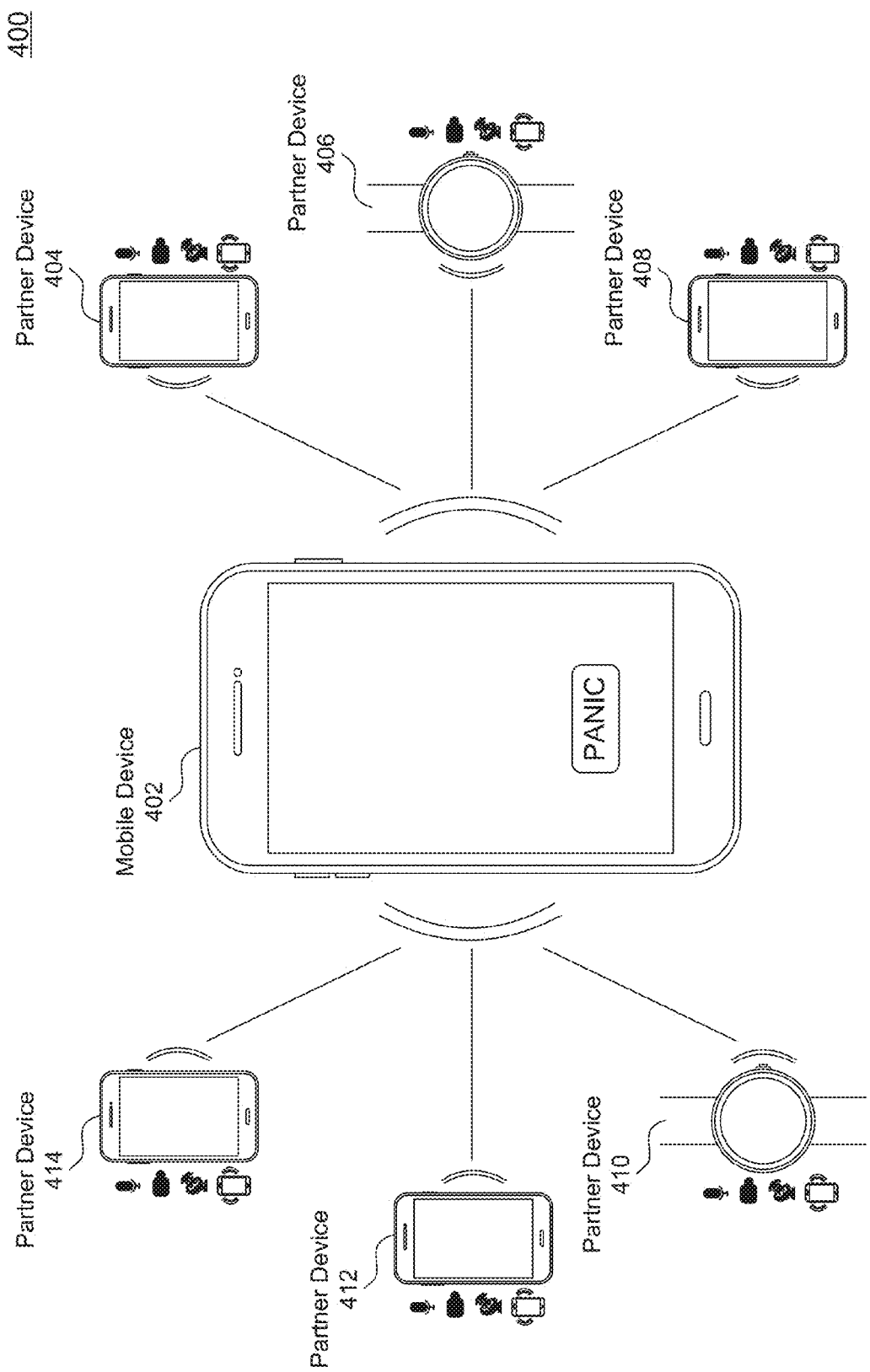
FIG. 4 is a diagram illustrating example activation of a panic assistance mode on partner devices within the vicinity of a mobile device, according to an embodiment.

FIG. 4 is a diagram 400 illustrating example activation of a panic assistance mode on partner devices within the vicinity of a mobile device, according to an embodiment. Mobile device 402 may be similar to mobile device 110 of FIG. 1. In addition to activation of a panic mode on mobile device 402, in an embodiment, mobile device 402 may activate a panic assistance mode on one or more partner devices 404-414 within the vicinity of mobile device 402. The panic assistance mode may be activated via an activator, such as activator 112 of FIG. 1.

Upon activation of the panic assistance mode, partner devices 404-414 may collect and record situational and location-based data in a similar manner as described with respect to mobile device 110 of FIG. 1. The data collected and recorded by partner devices 404-414 may be periodically or continuously transmitted to support servers, such as support servers 104, and a tracking database, such as tracking database 130, for storage and further analysis. In this manner, partner devices 404-414 may provide additional situational data that may be used to track mobile device 402 and assess the surrounding location.

In an embodiment, partner devices 404-414 may also continuously search for the mobile device and other devices detected by the mobile device while the panic assistance mode is active. As other devices are detected by mobile device 402, recorded identifiers may be transmitted to partner devices 404-414, either directly from mobile device 402 or via the support servers. When one of these devices or mobile device 402 is detected by one of partner devices 404-414, the partner device may transmit an alert to appropriate parties within a panic group associated with mobile device 402 (e.g., panic group 120 of FIG. 1). In this manner, partner devices 404-414 may cooperate as a team to provide additional situational data and transmit alerts when other devices are detected. The additional collected data may be pieced together with data collected by mobile device 402 to provide an intelligent assessment of the current situation. This functionality may be particularly useful in a law enforcement context in which teams of individuals are employed for a particular task. In an embodiment, partner devices 404-414 may also record and transmit identifiers for other devices discovered nearby.

Figure 5:
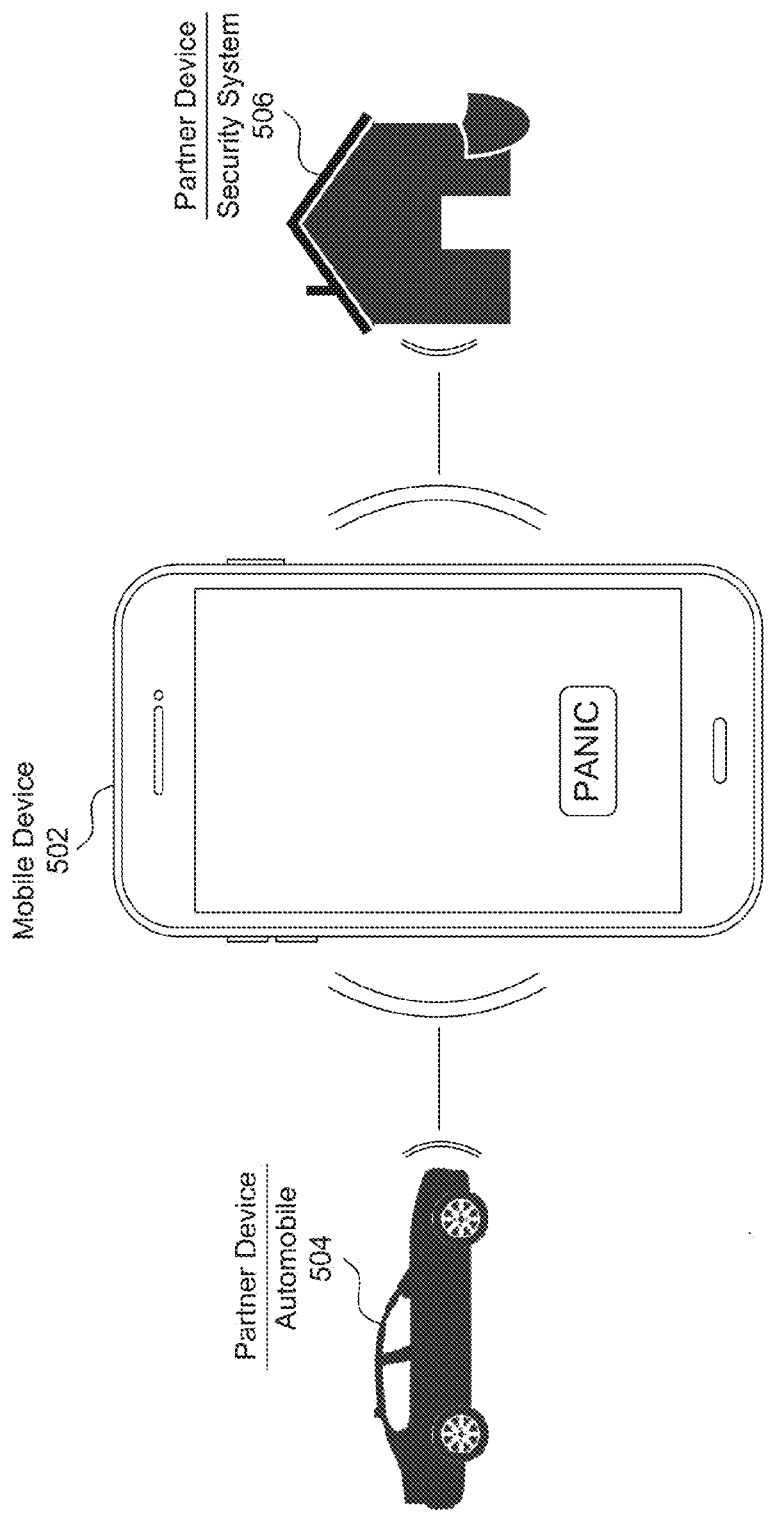
FIG. 5 is a diagram further illustrating example activation of a panic assistance mode on partner devices within the vicinity of a mobile device, according to an embodiment.

FIG. 5 is a diagram 500 further illustrating example activation of a panic assistance mode on partner devices within the vicinity of a mobile device, according to an embodiment. For example, mobile device 502 may activate panic assistance features integrated into an automobile 504 or a security system 506. Mobile device 502 may be similar to mobile device 110 of FIG. 1. The panic assistance features may be activated via an activator, such as activator 112 of FIG. 1.

In an embodiment, automobile 504 may include a Bluetooth and/or cellular receiver. When a panic mode is activated on mobile device 502, automobile 504 may be alerted via the Bluetooth or cellular receiver to activate panic assistance features. In an embodiment, automobile 504 may act as a partner device as described with respect to partner devices 404-414 of FIG. 4, collecting additional situational data and transmitting alerts when other devices of interest are detected. Automobile 504 may further make use of available resources, for example transmitting an alert to a panic group, such as panic group 120 of FIG. 1, via an integrated cellular-enabled device, or activating an alarm system installed in the automobile. These features may be useful in use cases where, for example, an individual activates the panic mode on mobile device 502 while walking to his or her car.

In an embodiment, security system 506 may similarly include a Bluetooth and/or cellular receiver. When a panic mode is activated on mobile device 502, security system 506 may be alerted via the Bluetooth or cellular receiver to activate panic assistance features. In an embodiment, security system 506 may represent or be linked to a home or office security system, and may provide panic assistance features integrated into the security system. For example, upon activation of the panic mode on mobile device 502, security system 506 may alert a security system provider or law enforcement, activate a siren or audible alarm, turn on house lights, or cause a home telephone to ring. Security system 506 may also act as a partner device as described with respect to partner devices 404-414 of FIG. 4, collecting additional situational data using available sensors built into the home or office security system (e.g., microphones and cameras). These features may be useful in use cases where, for example, an individual activates the panic mode on mobile device 502 while walking to or from home or work.

Example Method

Figure 6:
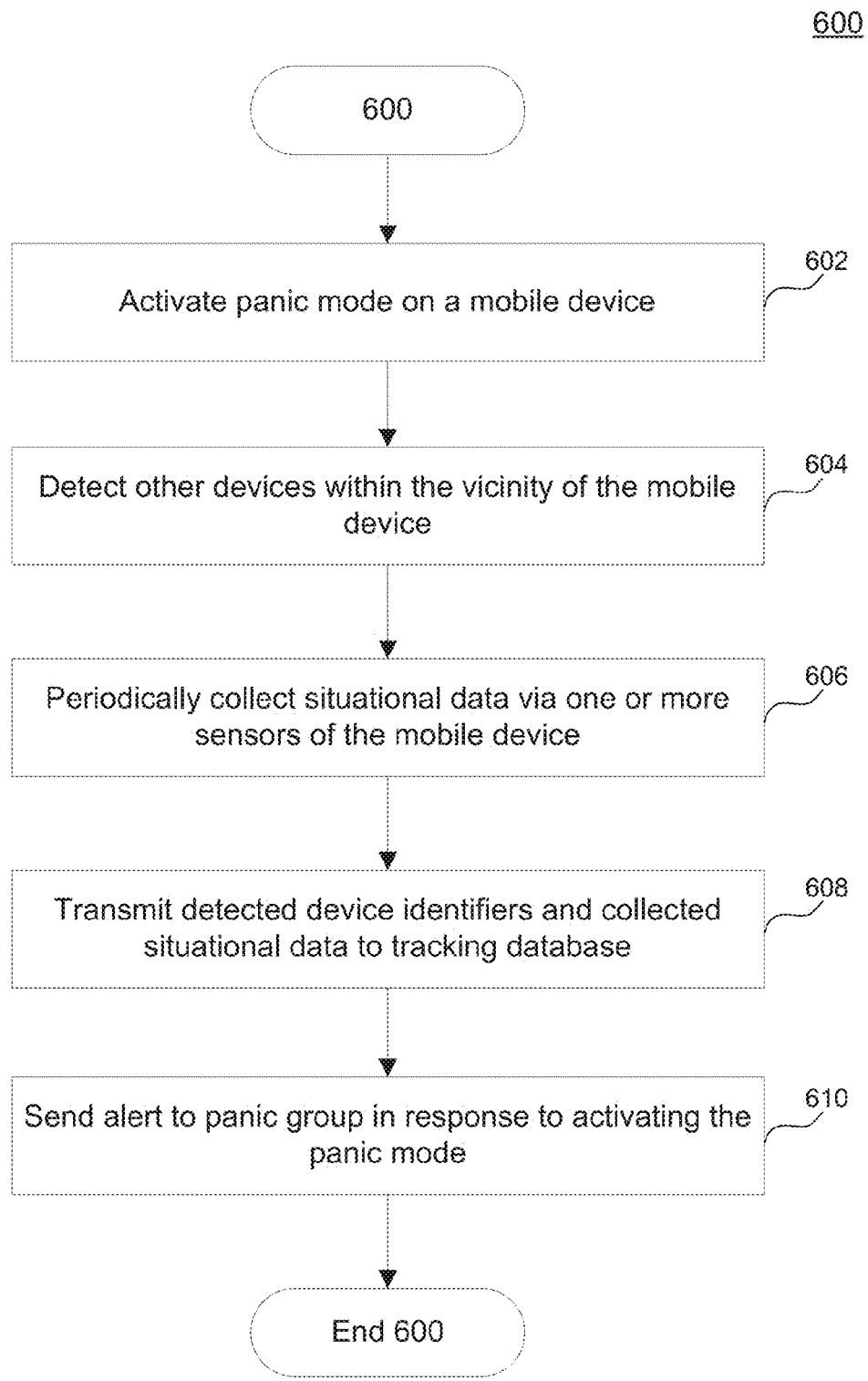
FIG. 6 is an example method for providing emergency notification and tracking data from a mobile device, according to an embodiment.

FIG. 6 is an example method 600 for providing emergency notification and tracking data from a mobile device, according to an embodiment. At stage 602, a panic mode may be activated on a mobile device, such as mobile device 110 of FIG. 1. In an embodiment, the panic mode may be initiated by an activator, such as activator 112 of FIG. 1. The panic mode may be activated in response to different triggers in various embodiments. For example, a user of the mobile device may explicitly activate the panic mode through a particular button sequence or voice command. The panic mode may also be activated based on entering or exiting a defined geofence, for example if the mobile device leaves an area in which the device was expected to remain or deviates from an expected route. In another example, the panic mode may be activated based on physical movement or contact with the device, for instance if the mobile device is thrown or experiences considerable physical impact. In yet another example, the panic mode may be activated remotely via another mobile device or a wearable device, for instance via a smart watch or fitness tracker connected to the mobile device.

At stage 604, other devices within the vicinity of the mobile device may be detected. In addition to a GPS receiver, the mobile device may be capable of establishing other data connections, such as Bluetooth, Wi-Fi, and cellular connections. When the panic mode is activated, a data collector, such as data collector 114 of FIG. 1, may scan for devices that are visible via one or more of the available data connections of the mobile device. For example, a mobile phone or car visible via a Bluetooth connection, a nearby cellular tower or base station via a cellular connection, or a Wi-Fi access point visible via a Wi-Fi connection may be detected by the mobile device. For each detected device, one or more identifiers may be recorded, such as a Bluetooth address, Cell ID, SSID (e.g., Wi-Fi network name), BSSID (e.g., address of Wi-Fi access point), or MAC address. In an embodiment, additional device information may also be recorded when available, such as device location information. The mobile device may continuously scan for devices nearby while the panic mode is active.

At stage 606, situational data may be periodically collected via one or more sensors of the mobile device. In an embodiment, the mobile device may record an audio segment via a microphone on the mobile device and capture one or more photographs or videos via the camera(s) on the mobile device. Collection of audio, video, and photographs may occur immediately upon activation of the panic mode, and/or may be initiated based on particular triggers. For example, an audio clip may be recorded both immediately upon activation of the panic mode, and any time the surrounding decibel-level observed by the mobile device exceeds a predefined threshold. Similarly, a photograph or video may be captured both immediately upon activation of the panic mode, and in response to interaction with the mobile device. For example, an image may be captured when the power button is depressed, an invalid password is entered, a biometric sensor is used, or any other interaction with the mobile device is detected. The collected images, videos, and audio recordings may be of use to emergency responders in locating the mobile device and developing a response strategy.

In an embodiment, location data derived from a global positioning service (GPS) receiver of mobile device 110 may also be obtained and recorded when available. Collected GPS location data may provide an efficient way to locate the mobile device, but this information may not always be available or accurate. As such, in an embodiment, movement of the mobile device may additionally be recorded via one or more motion-detecting sensors of the mobile device including, but not limited to, an accelerometer, a gyroscope, a digital or analog compass, or a barometer. The collected movement may supplement the collected GPS data in determining the location of the mobile device when the panic mode is activated.

At stage 608, identifiers of the detected devices and collected situational data may be transmitted to a tracking database, such as tracking database 130 of FIG. 1, where the data may be recorded. At stage 610, an alert may be sent to parties within a panic group associated with the mobile device, such as panic group 120 of FIG. 1, in response to activating the panic mode. The parties may include, for example, law enforcement and other emergency personnel, family members, coworkers, or other parties designated to receive notification in case of emergency. In an embodiment, the alert may be sent via an Internet Protocol (IP) connection, such as an existing cellular or Wi-Fi connection of the mobile device. The alert may be sent directly from the mobile device to the parties, or the alert may be sent to support servers, such as support servers 104 of FIG. 1, and then routed from the support servers to the parties to minimize transmission from the mobile device. In an embodiment, the alert may also be sent via an encrypted or unencrypted Short Message Service (SMS) text message.

This type of transmission may increase reliability of emergency alerts in areas where cellular service or bandwidth is limited.

Figure 7:
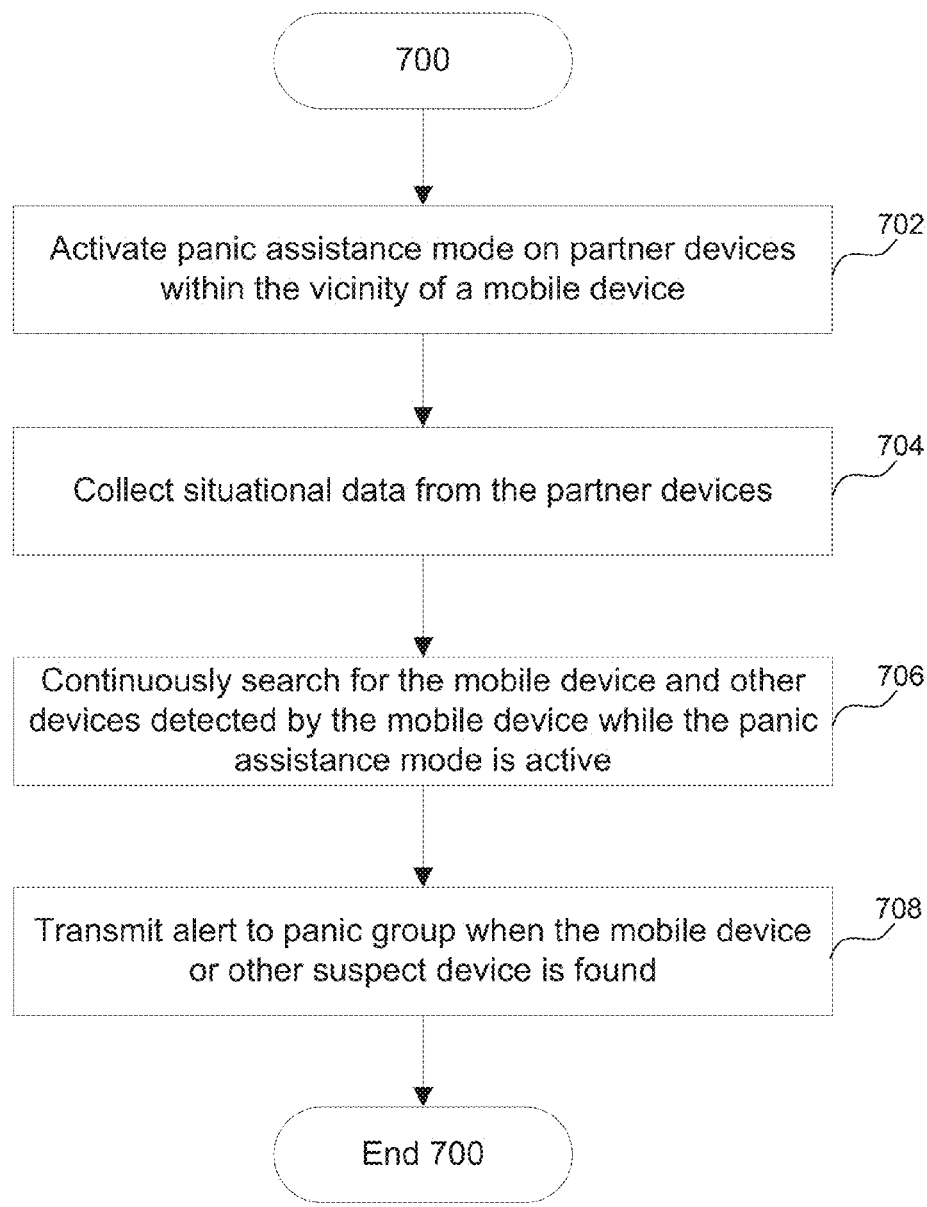
FIG. 7 is an example method for activating a panic assistance mode on devices within the vicinity of a mobile device, according to an embodiment.

FIG. 7 is an example method 700 for activating a panic assistance mode on devices within the vicinity of a mobile device, according to an embodiment. At stage 702, a panic assistance mode is activated on partner devices (e.g., partner devices 404-414 of FIG. 4) within the vicinity of a mobile device, such as mobile device 110 of FIG. 1. The panic assistance mode may be activated via an activator, such as activator 114 of FIG. 1.

At stage 704, situational data from the partner devices may be collected. This data may be collected in a similar manner as described with respect to mobile device 110 of FIG. 1. The data collected and recorded by the partner devices may be periodically transmitted to support servers, such as support servers 104, and a tracking database, such as tracking database 130, for storage and further analysis. In this manner, the partner devices may provide additional situational data that may be used to track mobile device 110 and assess the surrounding location.

At stage 706, each partner device may continuously search for the mobile device, and other devices detected by the mobile device, while the panic assistance mode is active. As devices are detected by the mobile device, recorded identifiers may be transmitted to the partner devices, either directly from the mobile device or via the support servers. At stage 708, an alert may be transmitted to parties within a panic group associated with the mobile device, such as panic group 120 of FIG. 1, when the mobile device or other device is found.

Example Computer System

Figure 8:
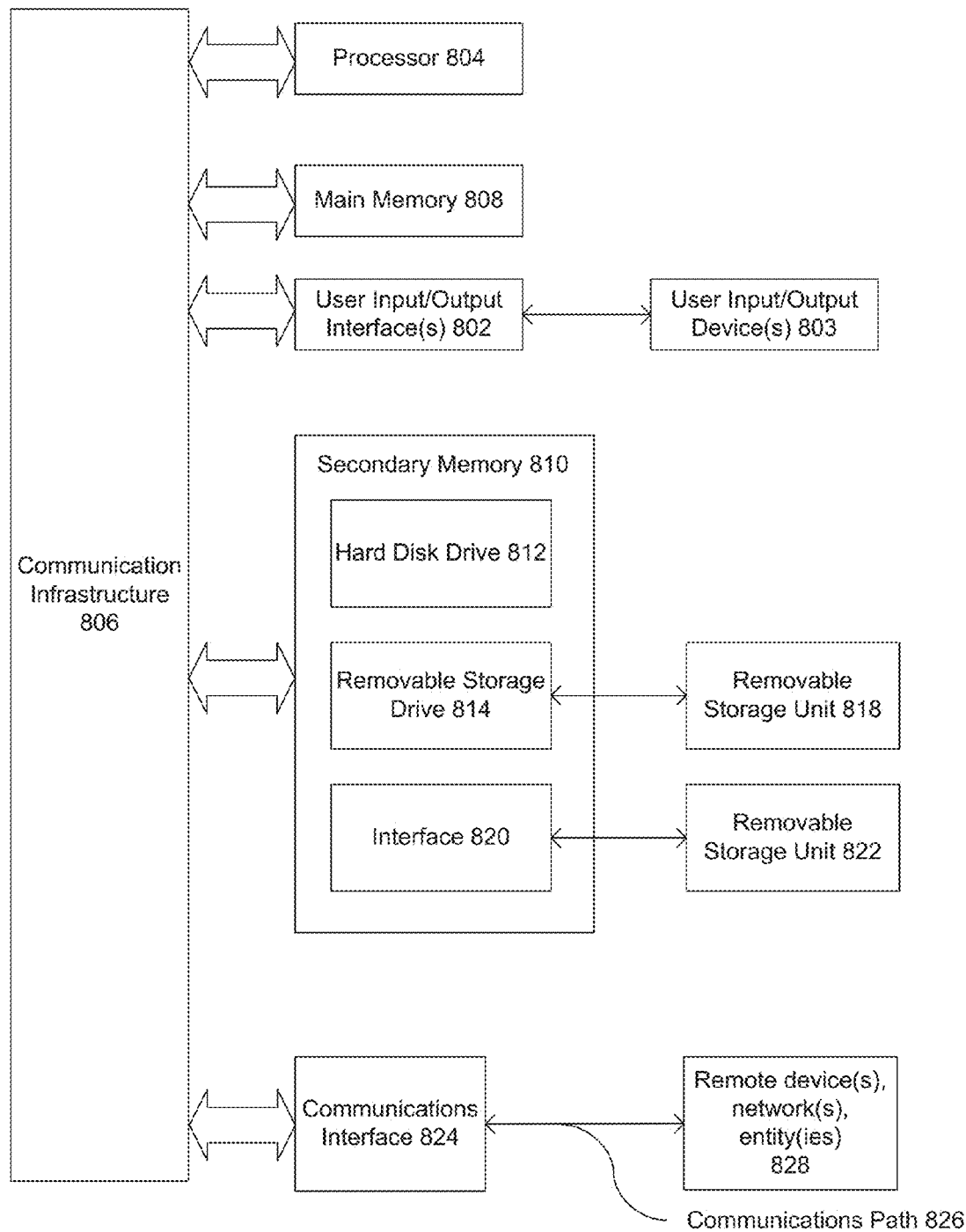
FIG. 8 is a diagram illustrating an example computing device, according to an embodiment.

FIG. 8 is an example computing system useful for implementing various embodiments. Various embodiments can be implemented, for example, using one or more well-known computer systems, such as computer system 800. Computer system 800 can be any well-known computer capable of performing the functions described herein, such as computers available from International Business Machines, Apple, Sun, HP, Dell, Sony, Toshiba, etc.

Computer system 800 includes one or more processors (also called central processing units, or CPUs), such as a processor 804. Processor 804 may be connected to a communication infrastructure or bus 806.

One or more processors 804 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 800 also includes user input/output device(s) 803, such as monitors, keyboards, pointing devices, etc., which communicate with communication infrastructure 806 through user input/output interface(s) 802.

Computer system 800 also includes a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/or any other computer data storage device. Removable storage drive 814 reads from and/or writes to removable storage unit 818 in a well-known manner.

According to an exemplary embodiment, secondary memory 810 may include other means, instrumentalities, or other approaches for allowing computer programs and/or other instructions and/or data to be accessed by computer system 800. Such means, instrumentalities, or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use the inventions using data processing devices, computer systems and/or computer architectures other than that shown in FIG. 8. In particular, embodiments may operate with software, hardware, and/or operating system implementations other than those described herein.

Embodiments of the present inventions have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the inventions that others can, by applying knowledge within the skill of the art, readily modify and/or adapt for various applications such specific embodiments, without undue experimentation, without departing from the general concept of the present inventions. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present inventions should not be limited by any of the above-described embodiments, but should be defined only in accordance with the following claims and their equivalents

What is claimed is:

1. A mobile device, comprising:
    a memory;
    at least one processor coupled to the memory and configured to:
        activate a panic mode on the mobile device;
        detect other devices within the vicinity of the mobile device, wherein each detected device includes at least one device identifier detectable by the mobile device;
        periodically collect situational data via one or more sensors of the mobile device;
        transmit the detected device identifiers and the collected situational data upon activating the panic mode;
        increment a frequency of transmission of the detected device identifiers and the collected situational data upon activating the panic mode;
        send an alert to one or more parties in response to activating the panic mode, wherein the one or more parties are designated by the mobile device to receive notification in case of emergency; and
        activate a panic assistance mode on a partner device within the vicinity of the mobile device,
    wherein, in response to activation of the panic assistance mode, the partner device is configured to:
        collect situational data via one or more sensors of the partner device;
        periodically search for the mobile device while the panic assistance mode is active;
        periodically search for the other devices previously detected by the mobile device while the panic assistance mode is active; and
        transmit an alert to the one or more parties in response to detecting the mobile device or one of the other devices detected by the mobile device.

2. The mobile device of claim 1, wherein the panic mode is activated via a button sequence on the mobile device.

3. The mobile device of claim 1, wherein the panic mode is activated based on a geofence trigger.

4. The mobile device of claim 1, wherein the panic mode is activated based on physical movement of or contact with the mobile device.

5. The mobile device of claim 1, wherein the panic mode is activated via a wearable device connected to the mobile device.

6. The mobile device of claim 1, wherein the mobile device is a wearable device.

7. The mobile device of claim 1, wherein the at least one processor is further configured to detect other devices by:
    scanning for devices visible to the mobile device via at least one of a Bluetooth, Wi-Fi, and cellular connection of the mobile device in response to activating the panic mode;
    recording at least one identifier for each of the devices visible to the mobile device; and
    periodically scanning thereafter for devices visible to the mobile device while the panic mode is active.

8. The mobile device of claim 1, wherein at least one processor is further configured to periodically collect situational data by:
    recording an audio segment via a microphone of the mobile device;
    capturing one or more photographs via a camera of the mobile device;
    recording movement of or contact with the mobile device via one or more motion-detecting sensors of the mobile device, wherein the one or more motion-detecting sensors include at least one of an accelerometer, a gyroscope, a compass, and a barometer; and
    obtaining location data via a global positioning system (GPS) receiver of the mobile device.

9. The mobile device of claim 1, wherein the at least one processor is further configured to transmit the detected device identifiers and the collected situational data to a tracking database, the tracking database storing a plurality of data collected by the mobile device.

10. A method for providing emergency notification and tracking data from a mobile device, comprising:
    activating a panic mode on the mobile device;
    detecting other devices within the vicinity of the mobile device, wherein each detected device includes at least one device identifier detectable by the mobile device;
    periodically collecting situational data via one or more sensors of the mobile device;
    transmitting the detected device identifiers and the collected situational data upon activating the panic mode;
    incrementing a frequency of transmission of the detected device identifiers and the collected situational data upon activating the panic mode;
    sending an alert to one or more parties in response to activating the panic mode, wherein the one or more parties are designated by the mobile device to receive notification in case of emergency;
    activating a panic assistance mode on a partner device within the vicinity of the mobile device;
    collecting situational data via one or more sensors of the partner device;
    periodically searching, by the partner device, for the mobile device while the panic assistance mode is active;
    periodically searching, by the partner device, for the other devices previously detected by the mobile device while the panic assistance mode is active; and
    transmitting, by the partner device, an alert to the one or more parties in response to detecting the mobile device or one of the other devices detected by the mobile device.

11. The method of claim 10, wherein the panic mode is activated via a button sequence on the mobile device.

12. The method of claim 10, wherein the panic mode is activated based on a geofence trigger.

13. The method of claim 10, wherein the panic mode is activated based on physical movement of or contact with the mobile device.

14. The method of claim 10, wherein the panic mode is activated via a wearable device connected to the mobile device.

15. The method of claim 10, wherein the mobile device is a wearable device.

16. The method of claim 10, wherein the detecting further comprises:
- scanning for devices visible to the mobile device via at least one of a Bluetooth, Wi-Fi, and cellular connection of the mobile device in response to activating the panic mode;
- recording at least one identifier for each of the devices visible to the mobile device; and
- periodically scanning thereafter for devices visible to the mobile device while the panic mode is active.

17. The method of claim 10, wherein the collecting further comprises:
- recording an audio segment via a microphone of the mobile device;
- capturing one or more photographs via a camera of the mobile device;
- recording movement of or contact with the mobile device via one or more motion-detecting sensors of the mobile device, wherein the one or more motion-detecting sensors include at least one of an accelerometer, a gyroscope, a compass, and a barometer; and
- obtaining location data via a global positioning system (GPS) receiver of the mobile device.

18. The method of claim 10, further comprising transmitting the detected device identifiers and the collected situational data to a tracking database, the tracking database storing a plurality of data collected by the mobile device.

19. A non-transitory computer-readable storage device having instructions stored thereon that, when executed by at least one computing device, causes the at least one computing device to perform operations comprising:
- activating a panic mode on a mobile device;
- detecting other devices within the vicinity of the mobile device, wherein each detected device includes at least one device identifier detectable by the mobile device;
- periodically collecting situational data via one or more sensors of the mobile device;
- transmitting the detected device identifiers and the collected situational data upon activating the panic mode;
- incrementing a frequency of transmission of the detected device identifiers and the collected situational data upon activating the panic mode;
- sending an alert to one or more parties in response to activating the panic mode, wherein the one or more parties are designated by the mobile device to receive notification in case of emergency;
- activating a panic assistance mode on a partner device within the vicinity of the mobile device;
- collecting situational data via one or more sensors of the partner device;
- periodically searching, by the partner device, for the mobile device while the panic assistance mode is active;
- periodically searching, by the partner device, for the other devices previously detected by the mobile device while the panic assistance mode is active; and
- transmitting, by the partner device, an alert to the one or more parties in the panic group in response to detecting the mobile device or one of the other devices detected by the mobile device.

20. The non-transitory computer-readable storage device of claim 19, wherein the panic mode is activated via a wearable device connected to the mobile device.

21. The non-transitory computer-readable storage device of claim 19, wherein the detecting further comprises:
- scanning for devices visible to the mobile device via at least one of a Bluetooth, Wi-Fi, and cellular connection of the mobile device in response to activating the panic mode;
- recording at least one identifier for each of the devices visible to the mobile device; and
- periodically scanning thereafter for devices visible to the mobile device while the panic mode is active.

22. The non-transitory computer-readable storage device of claim 19, wherein the collecting further comprises:
- recording an audio segment via a microphone of the mobile device;
- capturing one or more photographs via a camera of the mobile device;
- recording movement of or contact with the mobile device via one or more motion-detecting sensors of the mobile device, wherein the one or more motion-detecting sensors include at least one of an accelerometer, a gyroscope, a compass, and a barometer; and
- obtaining location data via a global positioning system (GPS) receiver of the mobile device.

23. The non-transitory computer-readable storage device of claim 19, further comprising transmitting the detected device identifiers and the collected situational data to a tracking database, the tracking database storing a plurality of data collected by the mobile device.

* * * * *